(12) United States Patent
Berndt et al.

(10) Patent No.: US 6,658,897 B2
(45) Date of Patent: Dec. 9, 2003

(54) OPTICAL FIBER DRAW FURNACE HAVING A SIC OR SILICON NITRIDE TUBE

(75) Inventors: Jurgen Berndt, Viersen (DE); Michael Hoffart, Heiligenhaus (DE); Norbert Nowack, Willich (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/105,374

(22) Filed: Mar. 26, 2002

(65) Prior Publication Data

US 2002/0100297 A1 Aug. 1, 2002

Related U.S. Application Data

(62) Division of application No. 09/442,394, filed on Nov. 18, 1999, now abandoned.

(30) Foreign Application Priority Data

Jan. 8, 1999 (DE) .......................................... 199 00 375

(51) Int. Cl.⁷ .................................................. F27B 7/33
(52) U.S. Cl. ....................................................... 65/533
(58) Field of Search .............................. 65/373.13, 537

(56) References Cited

U.S. PATENT DOCUMENTS

| 4,210,431 A | 7/1980 | Bachman et al. |
| 4,547,644 A | 10/1985 | Bair et al. |
| 5,217,657 A | 6/1993 | Engle |
| 5,259,856 A | 11/1993 | Ohga et al. |
| 5,545,246 A | 8/1996 | Lysson et al. |
| 5,713,974 A | 2/1998 | Martin et al. |
| 6,044,663 A | 4/2000 | Uhn et al. |

FOREIGN PATENT DOCUMENTS

| DE | 27 01 646 A1 | 7/1977 |
| DE | 28 12 389 A1 | 10/1978 |
| DE | 28 18 550 A1 | 3/1979 |
| DE | 43 39 077 A1 | 5/1995 |
| EP | 0 420 148 A1 | 4/1991 |
| EP | 0 464 613 A1 | 1/1992 |
| FR | 2 312 004 | 12/1976 |
| GB | 2 121 028 A | 12/1983 |
| GB | 2 212 028 A | 12/1983 |
| GB | 2 174 384 A | 11/1986 |
| GB | 2 192 698 | 1/1988 |
| JP | 53-135648 | 1/1978 |
| WO | WO 99/23040 | 5/1999 |
| WO | 99/23040 | 5/1999 |

Primary Examiner—John Hoffmann
(74) Attorney, Agent, or Firm—Sughrue Mion, PLLC

(57) ABSTRACT

An apparatus for drawing a fiber (11), particularly an optical glass fiber, from a heated preform (9), has a tubular heating element (1), which encloses preform (9) at least partly in its longitudinal direction, and an induction coil (4) surrounding tubular heating element (1) at a radial distance. Along an inside surface (19) of the tubular heating element (1) a protective tube (20) is provided, which surrounds fiber (11) and preform (9) at a radial distance. Protective tube (20) reliably prevents burning off of the heating element and thus a deterioration of the properties of the fiber (11).

6 Claims, 1 Drawing Sheet

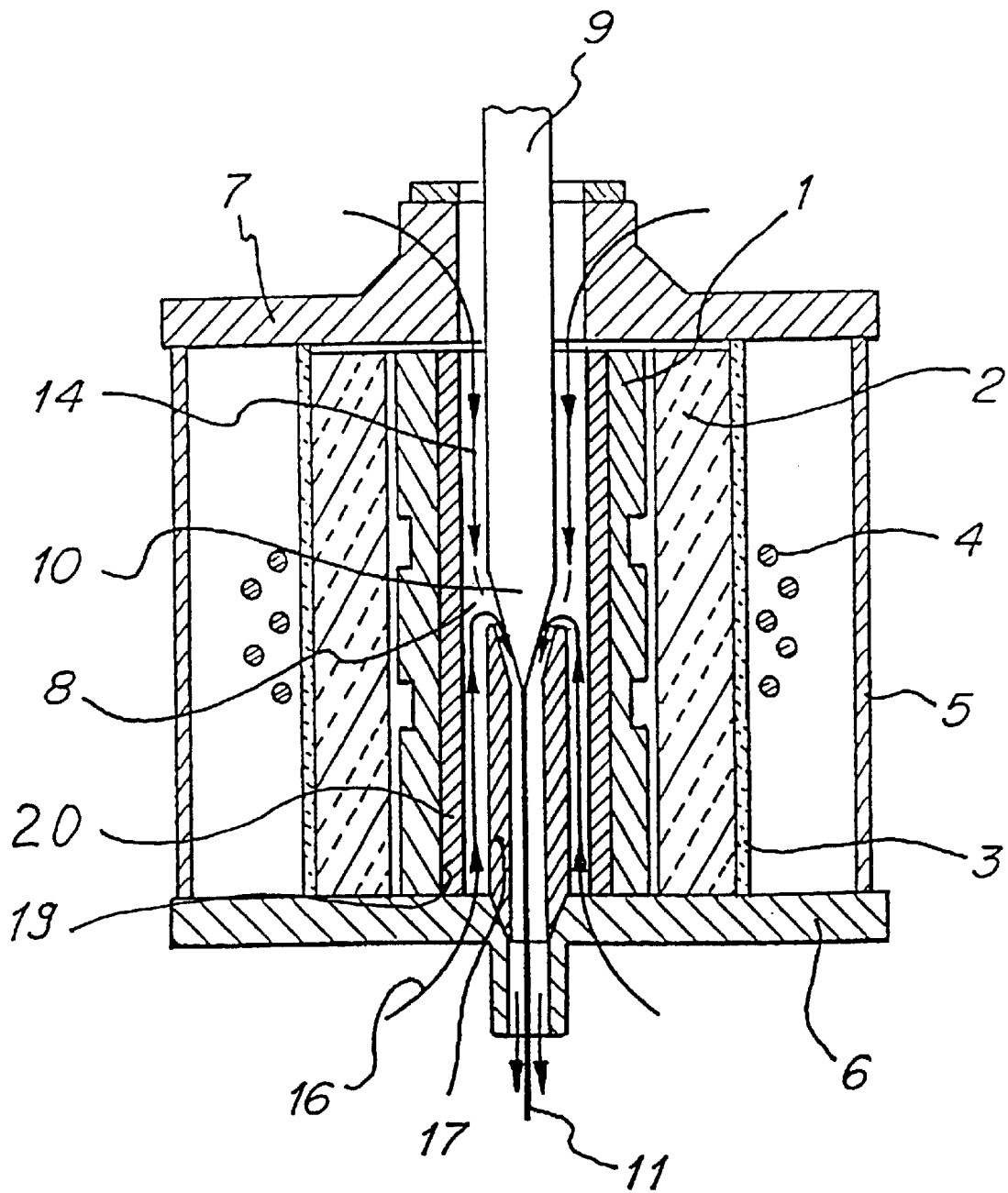
Fig.

OPTICAL FIBER DRAW FURNACE HAVING A SIC OR SILICON NITRIDE TUBE

This is a divisional of Application Ser. No. 09/442,394, filed Nov. 18, 1999 now abandoned; the disclosure of which is incorporated herein by reference.

BACKGROUND OF THE INVENTION

The present invention relates to a device for drawing a fiber, particularly an optical glass fiber, from a heated preform, the apparatus having a tubular heating element which encloses the preform at least partially in its longitudinal direction, and an induction coil surrounding the tubular heating element at a radial distance.

Due to the small outside diameters of optical glass fibers, direct production of the required fiber profile from different glass types is not possible. The basis for producing an optical glass fiber is therefore a so-called preform with a diameter in the centimeter range, which may be produced by a wide variety of processes.

Glass is an amorphous material that can be brought to a state of low viscosity by heating. In quartz glasses, which are typically used for fiber production today, the glass noticeably softens only at temperatures of approximately 2000 to 2200° C. This softening of the glass at a corresponding temperature is used to draw out the preform into a thin glass fiber. For this purpose, the preform is heated in a so-called drawing oven.

DE 43 39 077 C2 describes such a drawing oven, which has a tubular heating element of graphite and an annular induction coil surrounding this tubular heating element at a radial distance. Due to the high temperatures of the heating element and the oxygen present in the oven chamber, which is purged with a protective gas, graphite particles may be released from the hot surface of the heating element made of graphite, and may accumulate on the surface of the glass fiber. Furthermore, this release of graphite particles causes the surface of the heating element to burn off and thus shortens the life of the heating element.

SUMMARY OF THE INVENTION

An object of the present invention is thus to prolong the service life of the heating element of a drawing oven, prevent the release of particles from the hot surface of the heating element and thus reliably prevent any contamination of the drawn fiber surface by the particles released from the heating element.

The invention attains this object by providing a protective tube along the inside of the tubular heating element enclosing the fiber and the preform at a radial distance.

The advantages that may be obtained by the invention are in particular that the protective tube prevents the tubular heating element from burning off along its hot inner surface since the protective tube partitions off the heating element from the oxygen present in the oven chamber. This significantly prolongs the service life of the heating element and significantly improves the quality of the fibers drawn from the preform due to the absence of particle emissions from the heating element.

Additional features and advantages of the invention will be apparent from the description below and the appended claims.

For a particularly effective partitioning of the heating element from the oxygen present in the oven chamber, it is advantageous if the protective tube is oxygen impermeable.

It is particularly advantageous if the protective tube is made of glassy carbon. Glassy carbon is highly heat resistant and very durable. Isotropic bodies of glassy carbon have a high-quality surface finish, a dense structure, high chemical purity and good chemical resistance. A protective tube made of glassy carbon furthermore has properties similar to those of the heating element made of graphite.

It is also advantageous if the protective tube is made of mesophase graphite, which prevents the emission of particles from the surface of the heating element and itself does not emit any particles at the elevated temperatures in the drawing oven.

For the same reasons, it is also advantageous if the protective tube is made of a ceramic material such as silicon carbide or silicon nitride. These materials have electrical and physical properties similar to those of graphite, which is frequently used for the heating element.

To provide a simple structure of the apparatus according to the invention and reliably to prevent the heating element surface from burning off, it is advantageous if the protective tube and the heating element form a unit, particularly if the protective tube is integrated into the heating element.

BRIEF DESCRIPTION OF THE DRAWING

An exemplary embodiment of the invention is depicted in the single drawing FIGURE in simplified form, and further explained in the description below.

DETAILED DESCRIPTION OF THE INVENTION

The apparatus depicted in the FIGURE is for drawing, e.g., a fiber 11, particularly an optical glass fiber, from a heated preform 9. The apparatus includes a tubular heating element 1 made, for example, of graphite. In an outwardly radial direction, the tubular heating element 1 is enclosed by thermal insulation 2 made, for example, of graphite mats. To hold the graphite mats in their position, a quartz tube 3 encloses thermal insulation 2. In the outwardly radial direction, adjacent to quartz tube 3 enclosing the thermal insulation 2 is, for example, an annular induction coil 4 the electromagnetic field of which heats heating element 1, which is comparable to a short-circuited secondary coil.

Along the inside or interior wall 19 of tubular heating element 1, an oxygen impermeable protective tube 20 is arranged, which surrounds fiber 11 and preform 9 at a radial distance. This protective tube 20 is made, for example, of glassy carbon, but can also be made of mesophase graphite or a ceramic material such as silicon carbide or silicon nitride. In the depicted embodiment, protective tube 20 is directly adjacent to the inside of the tubular heating element 1 and forms a unit therewith. Protective tube 20 may also be integrated into heating element 1. Protective tube 20 prevents the oxygen present in the drawing oven from causing heating element 1 to burn off along inside surface 19, which would release particles from the inside surface 19 of heating element 20. Such particles may accumulate on fiber 11 and impair the optical and mechanical properties of the fiber. Furthermore, this partitioning of heating element 1 and minimization of the burning off of heating element 1 significantly prolongs the service life of the heating element.

Toward the outside, the apparatus is closed off by a tubular exterior wall 5 and by a flange-like bottom plate 6 and a flange-like oven cover 7. Preform 9 is introduced through oven cover 7 into an oven chamber 8. After corresponding heating of the lower end of preform 9, fiber 11 is drawn out of a so-called onion 10 after the glass material has been brought to its molten state. As indicated by arrows 14, a protective gas such as argon, nitrogen or the like is piped into oven chamber 8 through nozzles (not further depicted) arranged in oven cover 7, whereby this gas stream flows around preform 9 in the drawing direction of fiber 11. To prevent the gas introduced from above from changing from its laminar flow to a turbulent flow in the area of onion 10, additional purge gas is introduced from below as indicated by arrows 16, for example, by means of an additional guide tube 17, which then stabilizes the entire purge gas stream. Guide tube 17 extends in axial direction up into the drawing area, i.e., up into the high temperature area of the apparatus. The additional purge gas (arrows 16) is deflected at the upper end of guide tube 17 by the gas coming in from above (arrows 14) and is guided downwardly within the interior of guide tube 17 whereby it sheathes fiber 11.

What is claimed is:

1. An apparatus for drawing a fiber (11), particularly an optical glass fiber, from a heated preform (9), said apparatus including a tubular heating element (1) which encloses preform (9) at least partly in its longitudinal direction, and an induction coil (4) surrounding the tubular heating element (1) at a radial distance, said apparatus further comprising a protective tube (20) along an inside surface (19) of the tubular heating element (1), said protective tube (20) surrounding fiber (11) and preform (9) at a radial distance, wherein the entire protective tube (20) is made of silicon carbide.

2. An apparatus according to claim 1, wherein the protective tube (20) and the heating element (1) form a unit.

3. An apparatus according to claim 1, wherein the protective tube (20) is integrated into the heating element (1).

4. An apparatus for drawing a fiber (11), particularly an optical glass fiber, from a heated preform (9), said apparatus including a tubular heating element (1) which encloses preform (9) at least partly in its longitudinal direction, and an induction coil (4) surrounding the tubular heating element (1) at a radial distance, said apparatus further comprising a protective tube (20) along an inside surface (19) of the tubular heating element (1), said protective tube (20) surrounding fiber (11) and preform (9) at a radial distance, wherein the entire protective tube (20) is made of silicon nitride.

5. An apparatus according to claim 4, wherein the protective tube (20) and the heating element (1) form a unit.

6. An apparatus according to claim 4, wherein the protective tube (20) is integrated into the heating element (1).

* * * * *